United States Patent
Ishikawa et al.

(10) Patent No.: US 10,608,486 B2
(45) Date of Patent: Mar. 31, 2020

(54) INTERIOR PERMANENT MAGNET ELECTRIC MOTOR, COMPRESSOR, AND REFRIGERATING AND AIR-CONDITIONING DEVICE

(71) Applicant: Mitsubishi Electric Corporation, Tokyo (JP)

(72) Inventors: Atsushi Ishikawa, Tokyo (JP); Kazuhiko Baba, Tokyo (JP); Masahiro Nigo, Tokyo (JP); Kazuchika Tsuchida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 521 days.

(21) Appl. No.: 15/308,920

(22) PCT Filed: Jul. 1, 2014

(86) PCT No.: PCT/JP2014/067527
§ 371 (c)(1),
(2) Date: Nov. 4, 2016

(87) PCT Pub. No.: WO2016/002002
PCT Pub. Date: Jan. 7, 2016

(65) Prior Publication Data
US 2017/0070112 A1    Mar. 9, 2017

(51) Int. Cl.
*H02K 1/27* (2006.01)
*H02K 21/16* (2006.01)

(52) U.S. Cl.
CPC .......... *H02K 1/2766* (2013.01); *H02K 21/16* (2013.01)

(58) Field of Classification Search
CPC ................. H02K 1/2766; H02K 1/276; H02K 1/27–2793
(Continued)

(56) References Cited

U.S. PATENT DOCUMENTS 6,008,559 A * 12/1999 Asano ................... H02K 1/2766
310/156.53
2002/0175583 A1   11/2002 Kikuchi et al.
(Continued)

FOREIGN PATENT DOCUMENTS

CN        1629478 A     6/2005
CN      103166349 A     6/2013
(Continued)

OTHER PUBLICATIONS

MIT, Curvature and Radius of Curvature, Chapter 15.3, http://math.mit.edu/classes/18.013A/HTML/index.html. (Year: 2019).*
(Continued)

*Primary Examiner* — Thomas Truong
(74) *Attorney, Agent, or Firm* — Posz Law Group, PLC

(57) ABSTRACT

Provided is an interior permanent magnet motor, including: a stator; and a rotor, in which an outline of each of magnet insertion holes includes a radially inner-side line, a radially outer-side line, a pair of side lines, a pair of first round portions, and a pair of second round portions, in which a thin portion is formed between an outer peripheral surface of the rotor and each of the side lines, in which each of the first round portions is provided between a corresponding end of the corresponding radially outer-side line and a corresponding end of the corresponding side line, and in which each of the second round portions is provided between a corresponding end of the corresponding radially inner-side line and a corresponding end of the corresponding side line.

6 Claims, 4 Drawing Sheets

(58) Field of Classification Search
USPC .................................... 310/156.53, 156.56
See application file for complete search history.

(56) References Cited

U.S. PATENT DOCUMENTS

| | | | | |
|---|---|---|---|---|
| 2004/0145263 | A1* | 7/2004 | Kojima | H02K 1/276 310/156.23 |
| 2007/0126304 | A1* | 6/2007 | Ito | H02K 1/2766 310/156.53 |
| 2010/0166575 | A1* | 7/2010 | Fukuda | H02K 1/276 417/410.1 |
| 2014/0145539 | A1 | 5/2014 | Huang et al. | |
| 2014/0232232 | A1* | 8/2014 | Yamaguchi | H02K 1/2766 310/156.53 |

FOREIGN PATENT DOCUMENTS

| | | |
|---|---|---|
| EP | 2602911 A1 | 6/2013 |
| JP | 09-233744 A | 9/1997 |
| JP | 2000-270503 A | 9/2000 |
| JP | 2004-357468 A | 12/2004 |
| JP | 2005-124281 A | 5/2005 |
| JP | 2005-184874 A | 7/2005 |
| JP | 2007-159197 A | 6/2007 |
| JP | 2008-206308 A | 9/2008 |
| JP | 2013-123327 A | 6/2013 |

OTHER PUBLICATIONS

Libretexts Math, Curvature and Normal Vectors of a Curve, https://math.libretexts.org. (Year: 2019).*

Office Action dated Jan. 28, 2019 issued in corresponding in patent application No. 201647039223 (and English translation).

International Search Report of the International Searching Authority dated Sep. 2, 2014 for the corresponding international application No. PCT/JP2014/067527 (and English translation).

Office action dated Apr. 28, 2018 issued in corresponding CN patent application No. 201480079392.3 (and English translation thereof).

* cited by examiner

INTERIOR PERMANENT MAGNET ELECTRIC MOTOR, COMPRESSOR, AND REFRIGERATING AND AIR-CONDITIONING DEVICE

TECHNICAL FIELD

The present invention relates to an interior permanent magnet motor, a compressor, and a refrigeration and air conditioning apparatus.

BACKGROUND ART

In recent years, highly efficient motors have been demanded along with increasing energy saving consciousness, and there have been proposed a large number of interior permanent magnet motors using rare-earth magnets having high residual magnetic flux density and coercivity in a rotor to achieve high efficiency. Further, employment of structure in which the magnets are embedded in the rotor allows to use a reluctance torque as well as a magnet torque, thereby being available of constructing the highly efficient motor. The reluctance torque is proportional to a difference in inductance between a d-axis and a q-axis. Thus, in order to improve the reluctance torque, in general, it is desired to employ structure in which a q-axis magnetic flux easily passes therethrough and a d-axis magnetic flux less easily passes therethrough.

Meanwhile, in order to improve the magnet torque, it is desired to employ structure that can effectively use the magnetic flux of the magnet, and it is necessary to reduce a leakage magnetic flux. As a measure for reducing the leakage magnetic flux of the interior permanent magnet motor, it is effective that the thickness of each of thin portions between ends of a magnet insertion hole and a rotor surface is reduced to reduce a magnetic flux passing through each of the thin portions.

For example, in Patent Literature 1, there is disclosed structure in which the interval between the magnet insertion holes of the rotor is set larger than the tooth width of the stator, and the width of each of concave portions of the rotor outer surface at the vicinities of the ends of the magnet insertion hole is set larger than the interval between the above-mentioned magnet insertion holes, thereby being available of obtaining both the magnet torque and the reluctance torque.

CITATION LIST

Patent Literature

[PTL 1] JP 2005-124281 A

SUMMARY OF INVENTION

Technical Problem

However, by setting the width of each of the concave portions of the rotor outer surface longer at the vicinities of the ends of the magnet insertion hole, a ratio of each of the concave portions is increased in each of regions corresponding to the thin portions between the ends of the magnet insertion hole and the rotor surface, thereby causing a fear in that the thickness of each of the thin portions is extremely reduced. When the thickness of each of the thin portions is extremely reduced, there is a fear of leading to a problem in that a stress generated in each of the thin portions due to a centrifugal force acting during rotation of the rotor is increased, with the result that the specified mechanical strength cannot be secured.

The present invention has been made in view of the above, and has an object to provide an interior permanent magnet motor excellent in the rotor mechanical strength during an operation through providing thin portions.

Solution to Problem

In order to achieve the above-mentioned object, according to one embodiment of the present invention, there is provided an interior permanent magnet motor, including: a stator; and a rotor rotatably arranged so as to be opposed to the stator, in which the rotor includes a rotor core, in which a plurality of magnet insertion holes are formed in the rotor core, in which, as viewed in a plane having a rotation center line of the rotor as a normal, an outline of each of the magnet insertion holes includes a radially inner-side line, a radially outer-side line, a pair of side lines, a pair of first round portions, and a pair of second round portions, in which a thin portion is formed between an outer peripheral surface of the rotor and each of the side lines, in which each of the first round portions is provided between a corresponding end of the corresponding radially outer-side line and a corresponding end of the corresponding side line, and in which each of the second round portions is provided between a corresponding end of the corresponding radially inner-side line and a corresponding end of the corresponding side line.

A plurality of cutouts may be formed in the outer peripheral surface of the rotor, and the corresponding pair of cutouts may be formed to be line symmetric across a corresponding q-axis.

The each of the magnet insertion holes may be curved into an arc shape, and a convex portion side of the arc shape may be a center side of the rotor.

Further, in order to achieve the same object, according to one embodiment of the present invention, there is provided a compressor including, in an airtight container, a motor and a compression element. The motor is the above-mentioned interior permanent magnet motor of the one embodiment of the present invention.

Further, in order to achieve the same object, according to one embodiment of the present invention, there is provided a refrigeration and air conditioning apparatus including the above-mentioned compressor of the one embodiment of the present invention as a component of a refrigeration cycle.

Advantageous Effects of Invention

According to the present invention, it is possible to provide the interior permanent magnet motor excellent in the rotor mechanical strength during the operation through providing the thin portions.

DESCRIPTION OF EMBODIMENTS

Figure 1:
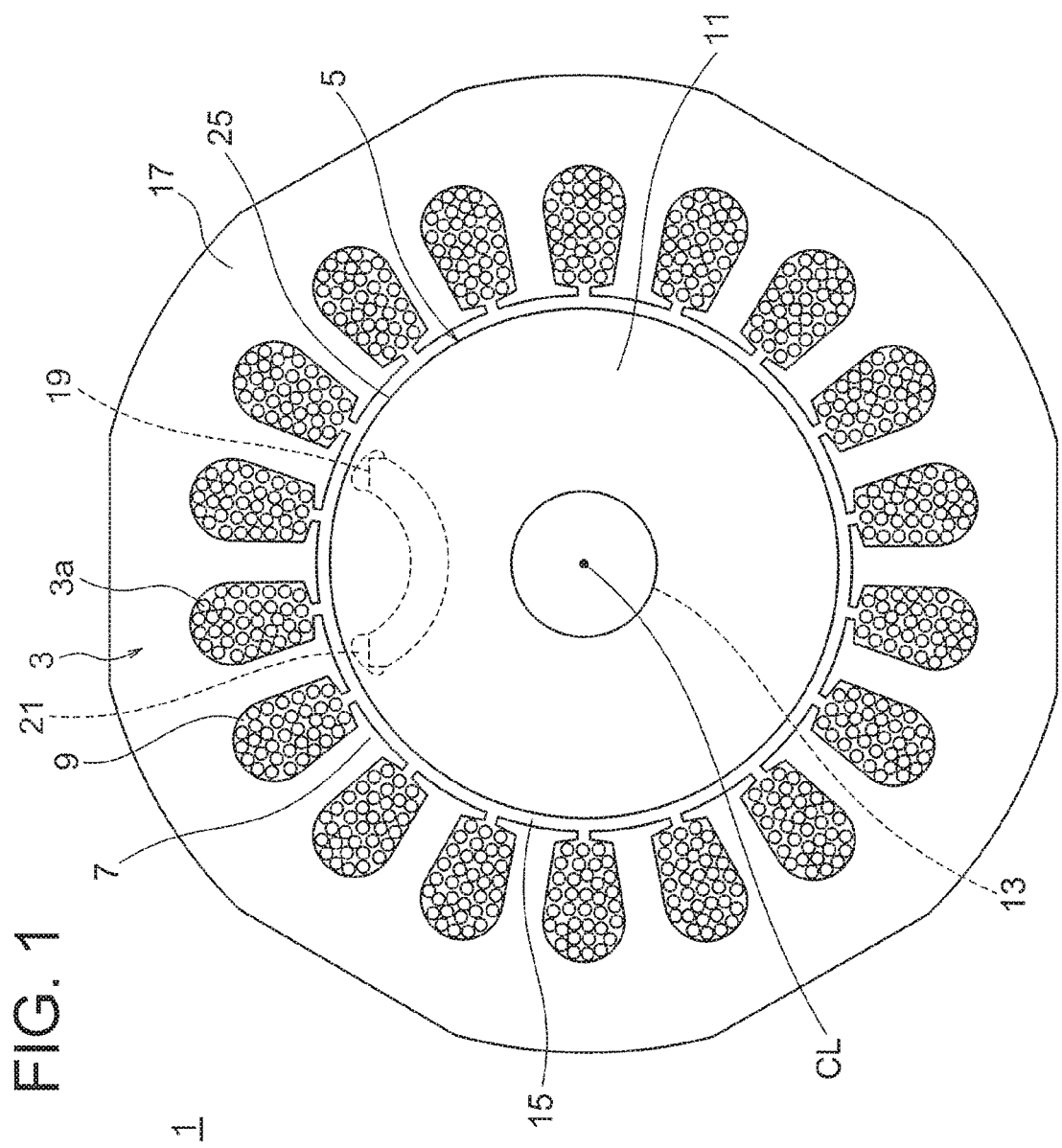
FIG. 1 is a view for illustrating an interior permanent magnet motor according to a first embodiment of the present invention as viewed in a plane orthogonal to a rotation center line.

Now, embodiments of the present invention are described referring to the accompanying drawings. Note that, in the drawings, the same reference symbols represent the same or corresponding parts.

First Embodiment

Figure 2:
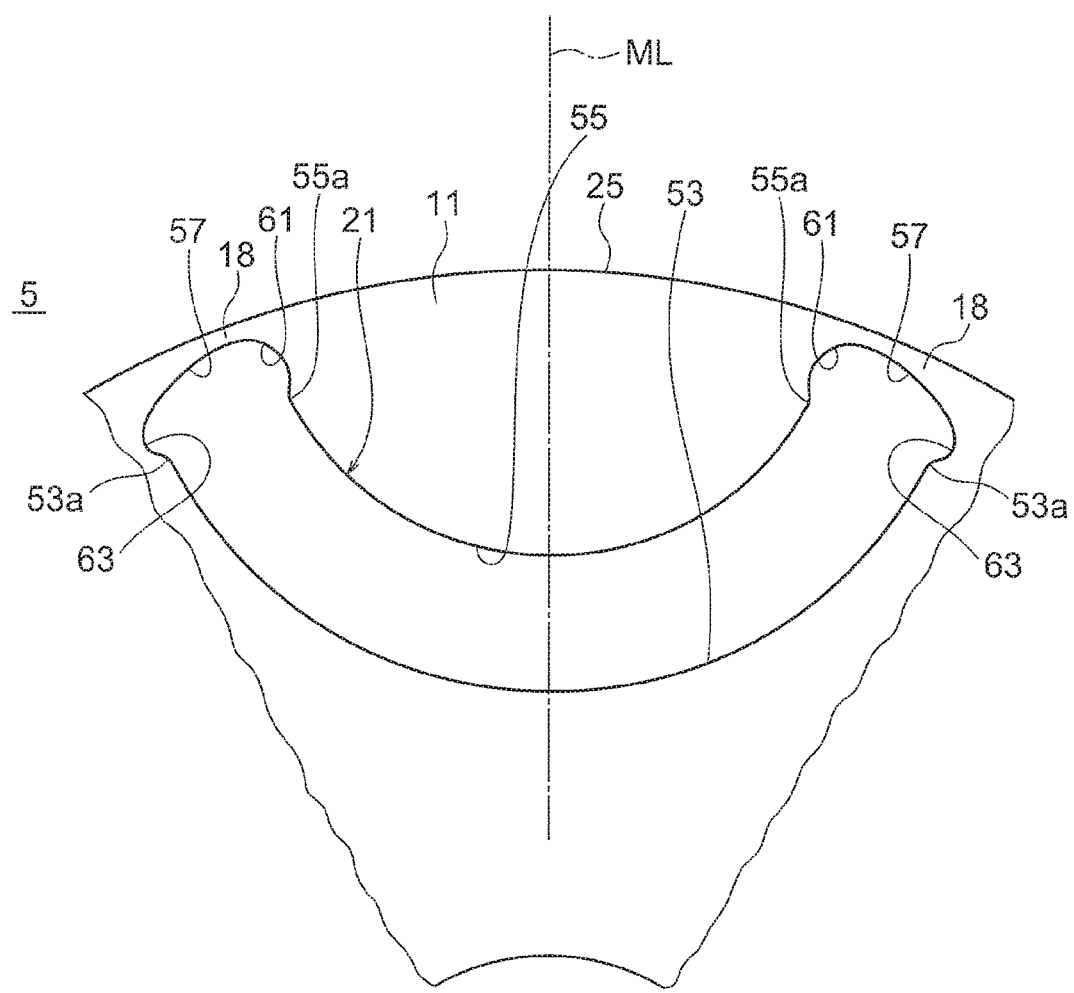
FIG. 2 is a view for illustrating a periphery of one magnet insertion hole of a rotor according to the first embodiment.

FIG. 1 is a view for illustrating an interior permanent magnet motor according to a first embodiment of the present invention as viewed in a plane orthogonal to a rotation center line. FIG. 2 is a view for illustrating a periphery of one magnet insertion hole of a rotor.

An interior permanent magnet motor 1 includes a stator 3 and a rotor 5 rotatably arranged so as to be opposed to the stator 3. The stator 3 includes a plurality of tooth portions 7. Each of the plurality of tooth portions 7 is adjacent to other tooth portions 7 through intermediation of corresponding slot portions 9. The plurality of tooth portions 7 and a plurality of the slot portions 9 are arranged alternately at equal intervals in a circumferential direction.

A stator winding 3a is wound around each of the plurality of tooth portions 7 by a so-called distributed winding method. The distributed winding method is a method of winding a wire in a distributed manner for each of the plurality of tooth portions 7 of the stator 3. This distributed winding method has an excellent feature in using a reluctance torque as compared to a concentrated winding method.

The rotor 5 includes a rotor core 11 and a shaft 13. The shaft 13 is coupled to an axial center portion of the rotor core 11 by shrink fitting, press fitting, or the like to transmit rotational energy to the rotor core 11. An air gap 15 is secured between an outer peripheral surface of the rotor 5 and an inner peripheral surface of the stator 3.

In such a configuration, the rotor 5 is held on an inner side of the stator 3 through intermediation of the air gap 15 so as to be rotatable about a rotation center line CL (rotation center of the rotor, axial line of the shaft). Specifically, a current having a frequency synchronized with an instructed number of revolutions is supplied to the stator 3 to generate a rotation magnetic field, thereby rotating the rotor 5.

Configurations of the stator 3 and the rotor 5 are described in detail. The stator 3 includes a stator core 17. The stator core 17 is formed by punching magnetic steel plates into a predetermined shape, and laminating a predetermined number of the magnetic steel plates while fastening the magnetic steel plates by caulking.

The rotatably held shaft 13 is arranged in the vicinity of a center of the stator 3. Further, the rotor 5 is fitted onto the shaft 13. The rotor 5 includes the rotor core 11, and similarly to the stator core 17, the rotor core 11 is also formed by punching magnetic steel plates into a predetermined shape, and laminating a predetermined number of the magnetic steel plates while fastening the magnetic steel plates by caulking.

Thin portions 18 each having a uniform thickness are present between a rotor outer peripheral surface 25 and side lines 57 described later. Those thin portions 18 each serve as a path for a leakage magnetic flux between adjacent magnetic poles, and hence it is preferred that the thin portions 18 each have a thickness as small as possible.

A plurality of permanent magnets 19, which are magnetized so that the N poles and the S poles are alternately located, are arranged in the rotor core 11. The permanent magnets 19 are formed by sintered ferrite magnets. As viewed in FIG. 1, each of the permanent magnets 19 is curved into an arc shape, and is arranged so that a convex portion side of the arc shape faces a center side of the rotor 5. In more detail, magnet insertion holes 21 as many as the number of the plurality of permanent magnets 19 are formed in the rotor core 11. The corresponding permanent magnets 19 are inserted into the plurality of magnet insertion holes 21, respectively.

The permanent magnets 19 are formed of the ferrite magnets. The ferrite magnets each contain an iron oxide ($Fe_2O_3$) as a main component. Thus, the ferrite magnets are inexpensive and the suppliability is stable as compared to rare-earth magnets to be used in a general interior permanent magnet motor. Further, the ferrite magnets are each easily formed into a magnet having an arc shape, thereby being capable of forming magnets insertable also into magnet insertion holes each having an inverted arc shape as in this embodiment.

Both of the plurality of permanent magnets 19 and the plurality of magnet insertion holes 21 are each formed into an inverted arc shape curved reversely to an arc of the rotor outer peripheral surface 25 in a radially inward-outward direction. That is, the plurality of permanent magnets 19 and the plurality of magnet insertion holes 21 are each formed into an arc shape convex toward the center side of the rotor 5 (concave toward the radially outer side, that is, the rotor outer peripheral surface 25 side). Further, as illustrated in FIG. 1, one permanent magnet 19 is inserted into one magnet insertion hole 21.

The number of magnetic poles of the rotor 5 may be any number as long as the number of poles is two or more. In this description, the case of six poles is described as an example. In FIG. 1, one pole is indicated by the dotted line. Six magnet insertion holes 21 are formed in the rotor 5 so as to be away from each other equiangularly. That is, the six magnet insertion holes 21 are each arranged so as to be away from the adjacent magnet insertion hole 21 by an angular distance of 60°. Further, regarding directions of the magnetic pole in the radial direction, six permanent magnets 19 are arranged so that the N poles and the S poles are alternately located along a rotor circumferential direction.

Next, the details of the magnet insertion holes are described. As viewed in a plane having the rotation center line CL of the rotor 5 as a normal, an outline (contour) of each of the magnet insertion holes 21 includes a radially inner-side line 53, a radially outer-side line 55, and the pair of side lines 57.

As illustrated in FIG. 2, the radially outer-side line 55 is formed by a first arc surface, and the radially inner-side line 53 is formed by a second arc surface. The arc of the first arc surface and the arc of the second arc surface have a common radius center, and the common radius center is located on the radially outer side with respect to the magnet insertion hole 21 and on a corresponding magnetic pole center line ML. In other words, the radially inner-side line 53 and the radially outer-side line 55 are formed concentrically. As described above, the center of the arc of the radially inner-side line 53 and the center of the arc of the radially outer-side line 55 coincide with each other, thereby improving the productivity of the rotor core 11 and the permanent magnets 19 to be inserted into the rotor core 11.

Further, as viewed in the plane having the rotation center line CL of the rotor 5 as the normal, each of the permanent magnet 19 and the magnet insertion hole 21 is formed linearly symmetric across the corresponding magnetic pole center line ML.

Further, in the first embodiment, the outline of each of the magnet insertion holes 21 includes, for one magnet insertion hole 21, four round portions, that is, a pair of first round portions 61 and a pair of second round portions 63.

Each of the pair of first round portions 61 connects a corresponding end 55a of the corresponding radially outer-side line 55 and a corresponding one end of the corresponding side line 57, and each of the pair of second round portions 63 connects the corresponding end 53a of the corresponding radially inner-side line 53 and the corresponding other end of the corresponding side line 57.

In the first embodiment, the first round portions 61 and the second round portions 63 are each curved into an arc shape, and the curvature of each of the first round portions 61 is smaller than the curvature of each of the second round portions 63. Further, in the first embodiment, the side lines 57 are each also curved into an arc shape, and the curvature of each of the side lines 57 is smaller than the curvature of each of the first round portions 61 and the curvature of each of the second round portions 63.

Further, the side lines 57, the first round portions 61, and the second round portions 63 are curved as described above. Thus, in the first embodiment, as viewed in the plane having the rotation center line CL of the rotor 5 as the normal, the outline between the corresponding end 55a of the radially outer-side line 55 and the corresponding end 53a of the radially inner-side line 53 is formed only by a curved line.

According to the interior permanent magnet motor of the above-mentioned first embodiment, the following advantages are obtained.

In general, a part of the magnetic flux from the magnet does not interlink with the stator winding, and passes through a core region between each of the ends of the magnet insertion hole and the rotor outer peripheral surface to return to the magnet. Thus, the core region serves as a path for a leakage magnetic flux. When the amount of the leakage magnetic flux is large, the magnetic flux of the magnet cannot be effectively used, leading to degradation of the motor efficiency. Thus, it is desired that the leakage magnetic flux be smaller. That is, in order to improve a magnet torque, it is necessary to reduce the leakage magnetic flux, and it is desired that the thickness of the core region between each of the ends of the magnet insertion hole and the rotor outer peripheral surface be smaller.

However, on the other hand, when the thickness of the core region between each of the ends of the magnet insertion hole and the rotor outer peripheral surface is reduced, due to a centrifugal force acting during rotation of the rotor, a stress generating in each of the thin portions is increased, thereby causing a fear in that the mechanical strength cannot be secured. The centrifugal force generated due to the rotation of the rotor is determined by a product of "the mass of the rotor", "a radius of the rotor", and "the square of rotational angular speed". Thus, at the rated number of revolutions in the use application of the motor, a maximum stress generated in the rotor core due to the centrifugal force must not exceed an endurance limit stress of each of the magnetic steel plates to be used, and it is necessary that the stress generated in the rotor core be smaller than the specified maximum stress. Further, the distribution of the stress generated in each of the thin portions due to the centrifugal force is unequalized, thereby causing a problem in that a significant stress is liable to be generated locally.

In view of the above, in the first embodiment, the first round portion 61 and the second round portion 63 are respectively formed between the end of each of the side lines 57 and the end of the corresponding radially outer-side line 55 and between the end of each of the side lines 57 and end of the corresponding radially inner-side line 53. Thus, through providing the thin portions 18, the distribution of the stress generated in each of the thin portions 18 can be equalized to prevent local generation of the stress. That is, the thickness is reduced to increase the magnetic resistance of the thickness so that the leakage magnetic flux can be reduced, and the distribution of the stress in each of the thin portions is distributed to reduce the locally generated stress so that the mechanical strength can be secured.

Further, each of the magnet insertion holes and the magnets is formed into an inverted arc shape so that the surface area of each of the magnets is increased, thereby being capable of obtaining a larger magnetic force. When the magnetic force is increased, an armature current necessary for generating a predetermined torque can be reduced. Thus, a copper loss is reduced, and the improvement in the motor efficiency is expectable. Further, a force of jumping out in the radial direction is generated in each of the magnets inserted into the magnet insertion holes due to the centrifugal force. The mass of the magnet is larger in the inverted arc shape than in a flat shape. Thus, under a condition that the number of revolutions and the outer diameter of the rotor are the same, an effect by the centrifugal force tends to be more significant in the inverted arc shape. Therefore, when the round portions are not provided unlike the first embodiment, the stress generated in each of the thin portions is increased more in the magnet having an inverted arc shape than in the magnet having a flat shape. Accordingly, the mode in which the round portions are provided as in the first embodiment is more effective specifically in the configuration of being capable of improving the motor efficiency due to the reduction in copper loss, which is attained by the magnet having an inverted arc shape.

Second Embodiment

Figure 3:
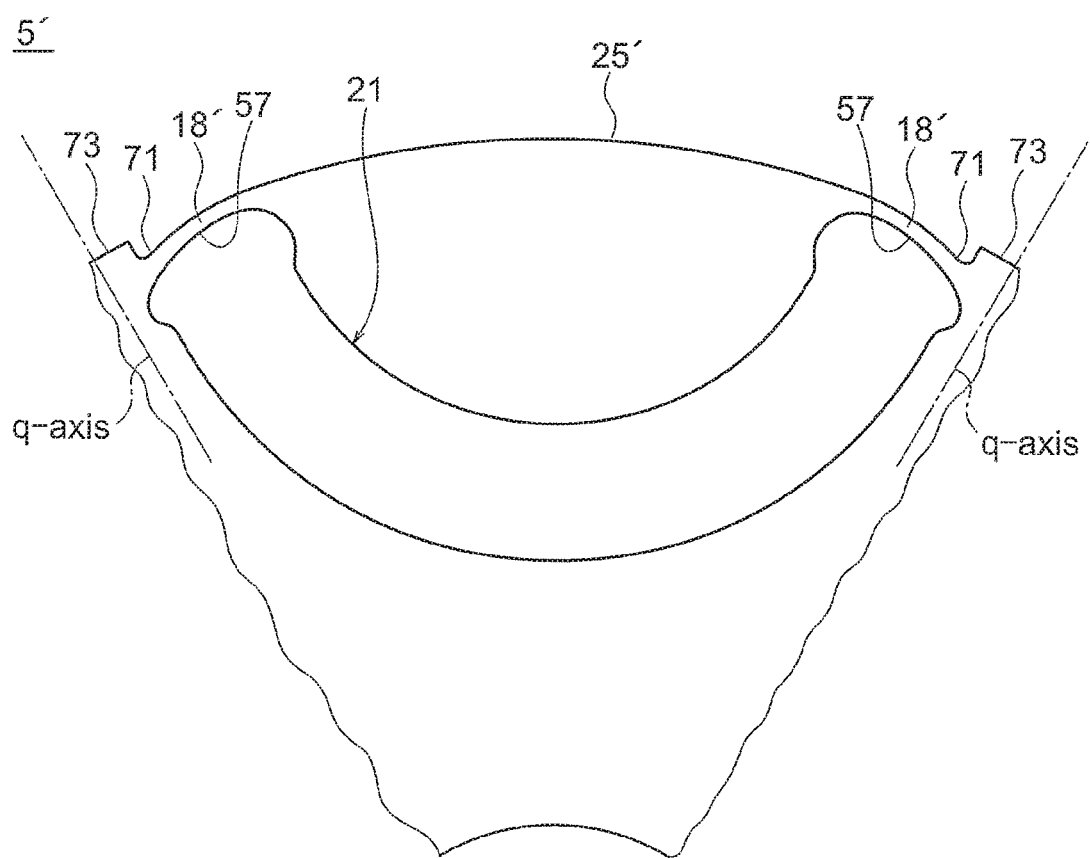
FIG. 3 is a view for illustrating a second embodiment of the present invention in the same manner as in FIG. 2.

Next, a second embodiment of the present invention is described. FIG. 3 is a view for illustrating the second embodiment in the same manner as in FIG. 2. The second embodiment is the same as the first embodiment described above except for parts to be described below.

A rotor outer peripheral surface 25' of a rotor 5' of the second embodiment has cutouts 71 at portions opposed to the respective side lines 57. The cutouts 71 are formed to be line symmetric across a corresponding q-axis (axis extending between the adjacent magnets (magnetic pole center line) and axis forming an electrical angle of 90 deg. with respect to a d-axis (center line of the magnet, magnetic pole centerline). The cutouts 71 extend in substantially parallel to the side lines 57, and the thickness of each of thin portions 18' between the cutouts 71 and the side lines 57 is substantially constant.

Further, the cutouts 71 are formed on both sides of the q-axis in the circumferential direction, and hence, as a relative convexo-concave relationship, a projection 73 is formed between the pair of cutouts 71. That is, the projection 73 is formed on the q-axis on the rotor outer peripheral surface 25'.

Also in the interior permanent magnet motor according to the second embodiment, which is constructed as described above, advantages similar to those of the above-mentioned first embodiment are obtained. Further, in the second embodiment, the magnetic resistance of each of the thin portions 18' is increased due to the cutouts 71 so that the leakage magnetic flux can be further reduced, and, in addition, a pass for a q-axis magnetic flux can be secured due to the projection 73 on the q-axis. That is, both the magnet torque and the reluctance torque can be generated effectively while utilizing the feature of the securement of the mechanical strength, which is described in the above-mentioned first embodiment.

Third Embodiment

Next, as a third embodiment of the present invention, there is described a rotary compressor having the interior permanent magnet motor according to the above-mentioned first or second embodiment mounted therein. The present invention encompasses a compressor having the interior permanent magnet motor according to the above-mentioned first or second embodiment mounted therein. However, the type of the compressor is not limited to the rotary compressor.

Figure 4:
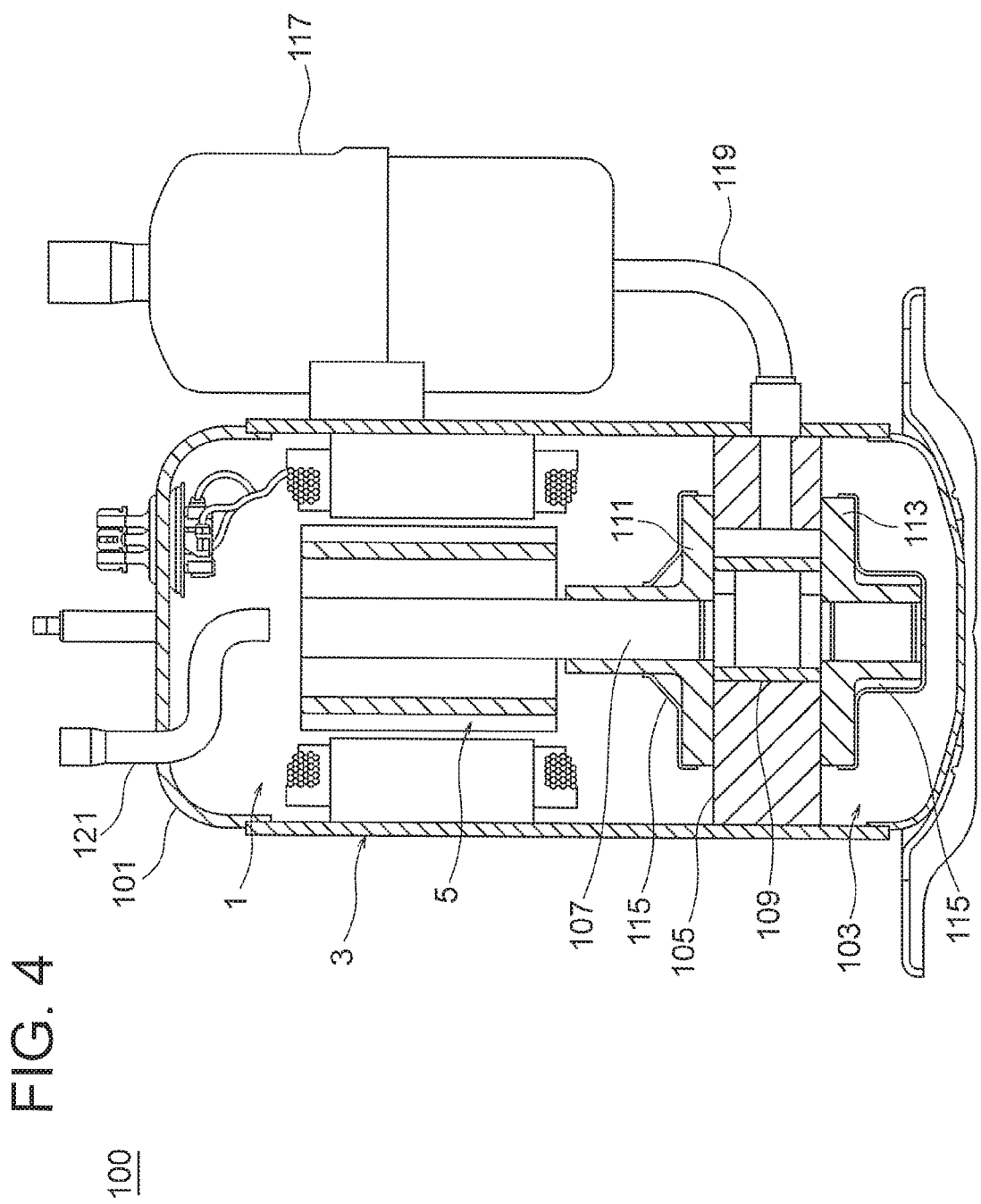
FIG. 4 is a vertical sectional view of a rotary compressor having the interior permanent magnet motor mounted therein.

FIG. 4 is a vertical sectional view of the rotary compressor having the interior permanent magnet motor mounted therein. A rotary compressor 100 includes the interior permanent magnet motor 1 (motor element) and a compression element 103 in an airtight container 101. Although not illustrated, a refrigerating machine oil for lubricating each of sliding portions of the compression element 103 is stored in a bottom portion of the airtight container 101.

The compression element 103 includes, as main components thereof, a cylinder 105 arranged in a vertically stacked state, a rotary shaft 107 serving as the shaft rotated by the interior permanent magnet motor 1, a piston 109 to be fitted by insertion into the rotary shaft 107, a vane (not shown) dividing an inside of the cylinder 105 into an intake side and a compression side, an upper frame 111 and a lower frame 113 being a pair of upper and lower frames into which the rotary shaft 107 is to be rotatably fitted by insertion and which are configured to close axial end surfaces of the cylinder 105, and mufflers 115 mounted on the upper frame 111 and the lower frame 113, respectively.

The stator 3 of the interior permanent magnet motor 1 is directly fixed to the airtight container 101 by a method such as shrink fitting or welding and is held thereby. A coil of the stator 3 is supplied with power from a glass terminal fixed to the airtight container 101.

The rotor 5 is arranged through intermediation of the air gap on a radially inner side of the stator 3, and is held in a rotatable state by bearing portions (upper frame 111 and lower frame 113) of the compression element 103 via the rotary shaft 107 (shaft 13) in the center portion of the rotor 5.

Next, an operation of the rotary compressor 100 is described. A refrigerant gas supplied from an accumulator 117 is taken into the cylinder 105 through an intake pipe 119 fixed to the airtight container 101. The interior permanent magnet motor 1 is rotated by energization of an inverter so that the piston 109 fitted to the rotary shaft 107 is rotated in the cylinder 105. With this, the refrigerant is compressed in the cylinder 105. The refrigerant, which has passed through the muffler 115, rises in the airtight container 101. At this time, the refrigerating machine oil is mixed into the compressed refrigerant. When the mixture of the refrigerant and the refrigerating machine oil passes through air holes 71 formed in the rotor core 11, the refrigerant and the refrigerating machine oil are promoted to be separated from each other, and hence the refrigerating machine oil can be prevented from flowing into a discharge pipe 121. In this manner, the compressed refrigerant is supplied on a high-pressure side of the refrigeration cycle through the discharge pipe 121 arranged on the airtight container 101.

As the refrigerant for the rotary compressor 100, R410A, R407C, R22, or the like that has hitherto been used may be used, but any refrigerant such as a refrigerant having a low global warming potential (GWP) may also be applied. In view of the prevention of global warming, a low GWP refrigerant is desirable. As typical examples of the low GWP refrigerant, the following refrigerants are given.

(1) A halogenated hydrocarbon having a carbon double bond in the composition; for example, HFO-1234yf (CF3CF=CH2) is given. An HFO is an abbreviation of a Hydro-Fluoro-Olefin, and an Olefin is an unsaturated hydrocarbon having one double bond. Note that, a GWP of HFO-1234yf is 4.

(2) A hydrocarbon having a carbon double bond in the composition; for example, R1270 (propylene) is given. Note that, R1270 has a GWP of 3, which is smaller than that of HFO-1234yf, but has higher combustibility than HFO-1234yf.

(3) A mixture containing at least any one of a halogenated hydrocarbon having a carbon double bond in the composition or a hydrocarbon having a carbon double bond in the composition; for example, a mixture of HFO-1234yf and R32 is given. HFO-1234yf, which is a low pressure refrigerant, is large in pressure loss and is thus liable to degrade the performance of the refrigeration cycle (in particular, in an evaporator). Therefore, a mixture of HFO-1234yf and R32 or R41 that is a refrigerant higher in pressure than HFO-1234yf is positively used in practice.

Also in the rotary compressor according to the third embodiment, which is constructed as described above, advantages similar to those of the above-mentioned first or second embodiment are obtained. Further, both the magnet torque and the reluctance torque can be effectively used, thereby being capable of constructing a highly efficient compressor.

Fourth Embodiment

Further, the present invention may be carried out as a refrigeration and air conditioning apparatus including the compressor of the above-mentioned third embodiment as a component of a refrigeration cycle. Note that, configurations of components other than the compressor in the refrigeration cycle of the refrigeration and air conditioning apparatus are not particularly limited.

Also in the refrigeration and air conditioning apparatus according to the fourth embodiment, which is constructed as described above, advantages similar to those of the above-mentioned third embodiment are obtained. Further, both the magnet torque and the reluctance torque can be effectively used, thereby being capable of constructing the highly efficient compressor. With this, the compressor can be employed in a refrigeration and air conditioning apparatus having the strict energy efficiency standards.

In the above, the details of the present invention are specifically described referring to the preferred embodiments. However, it is apparent to those skilled in the art that various modifications may be made based on the basic technical concept and the teachings of the present invention.

The invention claimed is:

1. An interior permanent magnet motor, comprising:
a stator; and
a rotor rotatably arranged so as to be opposed to the stator, wherein
the rotor comprises a rotor core,
a plurality of magnet insertion holes are formed in the rotor core,
as viewed in a plane having a rotation center line of the rotor as a normal, an outline of each of the magnet insertion holes comprises a radially inner-side line, a radially outer-side line, a pair of side lines, a pair of first round portions, and a pair of second round portions, a thin portion is formed between an outer peripheral surface of the rotor and each of the side lines, each of the first round portions is provided between a corresponding end of a corresponding radially outer-side line and a corresponding end of a corresponding side line, each of the second round portions is provided between a corresponding end of a corresponding radially inner-side line and a corresponding end of a corresponding side line, the first round portions, the second round portions, and the side lines are each curved into an arc shape, a curvature of each of the first round portions is smaller than a curvature of each of the second round portions, and the curvature of each of the side lines is smaller than the curvature of each of the first round portions and the curvature of each of the second round portions, wherein the radially outer-side line is formed by a first arc surface, the radially inner-side line is formed by a second arc surface, the arc of the first arc surface and the arc of the second arc surface have a common radius center, and each of the first round portions connects the corresponding end of the corresponding radially outer-side line and a corresponding one end of the corresponding side line, and each of the second round portions connects the corresponding end of the corresponding radially inner-side line and a corresponding other end of the corresponding side line.

2. The interior permanent magnet motor according to claim 1, wherein a plurality of cutouts are formed in the outer peripheral surface of the rotor, and adjacent two cutouts are formed to be line symmetric across a corresponding q-axis.

3. The interior permanent magnet motor according to claim 1, wherein the each of the magnet insertion holes is curved into an arc shape, and a convex portion side of the arc shape is a center side of the rotor.

4. A compressor, comprising, in an airtight container:
   a motor; and
   a compression element,
   wherein the motor comprises the interior permanent magnet motor of claim 1.

5. A refrigeration and air conditioning apparatus, comprising the compressor of claim 4 as a component of a refrigeration cycle.

6. The interior permanent magnet motor according to claim 1, wherein the magnetic insertion holes are each linearly symmetric about a magnetic pole center line and the first round portions are closer to each other than the second round portions in each of the magnetic insertion holes.

* * * * *